United States Patent
Cox (10) Patent No.: US 9,532,190 B2
(45) Date of Patent: Dec. 27, 2016

(54) EMBEDDED ADVERTISING IN MMS STATIONERY

(75) Inventor: Mary M. Cox, Raleigh, NC (US)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1183 days.

(21) Appl. No.: 12/270,957

(22) Filed: Nov. 14, 2008

(65) Prior Publication Data

US 2010/0124913 A1 May 20, 2010

(51) Int. Cl.
*H04W 4/12* (2009.01)
*H04L 12/58* (2006.01)

(52) U.S. Cl.
CPC .............. *H04W 4/12* (2013.01); *H04L 12/58* (2013.01); *H04L 12/584* (2013.01); *H04L 51/08* (2013.01); *G06F 2206/151* (2013.01); *H04L 12/5895* (2013.01)

(58) Field of Classification Search
CPC ......... H04W 4/12; H04L 12/58; H04L 12/584; H04L 12/5895; G06F 2206/151
USPC .................................. 455/412.1, 412.2, 466
See application file for complete search history.

(56) References Cited

U.S. PATENT DOCUMENTS

| | | | |
|---|---|---|---|
| 6,381,465 B1 * | 4/2002 | Chern .................. | H04L 12/5895 340/7.21 |
| 7,246,313 B2 | 7/2007 | Sung et al. | |
| 7,324,810 B2 * | 1/2008 | Nave et al. ................ | 455/414.1 |
| 7,357,323 B2 * | 4/2008 | Silverbrook et al. ..... | 235/462.01 |
| 2004/0189699 A1 * | 9/2004 | Dobronsky .................... | 345/751 |
| 2006/0019636 A1 * | 1/2006 | Guglielmi et al. ........ | 455/412.1 |
| 2006/0195505 A1 * | 8/2006 | Jerbi et al. .................... | 709/203 |
| 2006/0218577 A1 | 9/2006 | Goodman et al. | |
| 2007/0088851 A1 * | 4/2007 | Levkovitz ............. | G06Q 30/02 709/246 |
| 2007/0088852 A1 * | 4/2007 | Levkovitz .................... | 709/246 |
| 2007/0265915 A1 * | 11/2007 | Gould et al. ................... | 705/14 |
| 2008/0005057 A1 * | 1/2008 | Ozzie et al. ...................... | 707/1 |
| 2008/0057915 A1 * | 3/2008 | Lahtiranta et al. ........ | 455/414.1 |
| 2008/0244022 A1 * | 10/2008 | Johnson ........................ | 709/206 |
| 2008/0319844 A1 * | 12/2008 | Hua et al. ....................... | 705/14 |
| 2009/0132364 A1 * | 5/2009 | Agarwal ......................... | 705/14 |

(Continued)

FOREIGN PATENT DOCUMENTS

| | | |
|---|---|---|
| JP | 2001-051919 | 2/2001 |
| JP | 2002-288080 | 10/2002 |

(Continued)

OTHER PUBLICATIONS

Open Mobile Alliance, "MMS Message Template Specification", Jan. 2008, pp. 1-21.

(Continued)

*Primary Examiner* — Larry Sternbane
(74) *Attorney, Agent, or Firm* — Renner, Otto, Boisselle & Sklar, LLP.

(57) ABSTRACT

An electronic device includes a communication circuit configured to establish a communication over a wireless network, and a messaging circuit operative to create messages for transmission to other devices via said communication circuit. The messaging circuit is configured to automatically include into a user-composed message multimedia data that corresponds to an entity subsidizing the electronic device.

9 Claims, 3 Drawing Sheets

(56) References Cited

U.S. PATENT DOCUMENTS

| | | | |
|---|---|---|---|
| 2009/0156170 A1* | 6/2009 | Rossano et al. | 455/412.1 |
| 2009/0177541 A1* | 7/2009 | Martel et al. | 705/14 |
| 2009/0186635 A1* | 7/2009 | Vieri | G06Q 30/0241 |
| | | | 455/466 |
| 2009/0203359 A1* | 8/2009 | Makhoul et al. | 455/412.2 |
| 2010/0094659 A1* | 4/2010 | Schoenberg | 705/3 |
| 2010/0113074 A1* | 5/2010 | Sheppard | H04L 12/583 |
| | | | 455/466 |

FOREIGN PATENT DOCUMENTS

| | | |
|---|---|---|
| JP | 2004-334810 | 11/2004 |
| WO | WO 01/71616 A2 | 9/2001 |
| WO | 2006006753 | 1/2006 |
| WO | WO 2006006753 A1 * | 1/2006 |

OTHER PUBLICATIONS

International Search Report and Written Opinion from corresponding International Application No. PCT/US09/43802.
International Preliminary Report on Patentability from corresponding International Application No. PCT/US09/43802.
Extended European Search Report for Application No. 09826475 dated Oct. 19, 2012.

\* cited by examiner

EMBEDDED ADVERTISING IN MMS STATIONERY

TECHNICAL FIELD OF THE INVENTION

The present invention relates generally to electronic devices, such as electronic devices for engaging in voice communications and, more particularly, to a system and method for increasing a return on investment in branded electronic devices.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces.

A new trend in electronic devices is the so called "branded electronic device", such as branded phones, for example. These branded electronic devices are increasingly being offered by corporations as a way of promoting their products and/or services. For example, branded electronic devices may be provided to employees of the company free of charge, or they may be sold to the general public at a reduced price. In exchange for the free and/or reduced price of the electronic device, the company's logo, product(s), service(s), or other information may be imprinted on the electronic device (e.g., on the casing of the electronic device). In this manner, the company gains exposure of its products and/or services at a minimal cost.

SUMMARY

While branded electronic devices provide enhanced exposure to a company and/or its products/services, as the number of branded electronic devices subsidized by the company increases, the cost of these devices can be significant. Therefore, it is desirable for the subsidizing company to maximize its return on investment in the branded electronic devices.

A device and method in accordance with the present invention enables a subsidizing company to maximize its return on investment in the branded electronic device. More particularly, messages, such as multimedia messages, transmitted by the branded electronic device utilize branded multimedia messaging service (MMS). Branded MMS can include, for example, incorporating branded graphics and/or audio (e.g., advertising information) into MMS messages created on the electronic device, and these branded graphics and/or audio then are transmitted whenever the message is transmitted from the electronic device via MMS. In this manner, the subsidizing company's exposure is significantly increased. In particular, a party need not be in the presence of the branded electronic device to be exposed to the company's products and/or services.

According to one aspect of the invention, a method for using an electronic device to promote an entity or interest's of the entity includes: providing the electronic device with access to multimedia data, wherein the multimedia data corresponds to the entity or the interest of the entity; and automatically including the multimedia data in a user-composed message.

According to one aspect of the invention, the method further includes wirelessly transmitting the message to another device.

According to one aspect of the invention, automatically including in the multimedia data includes using a template as a starting point for the user-composed message, wherein the multimedia data is embedded in the template.

According to one aspect of the invention, the method further includes preventing the user from at least one of altering the template or selecting a different template.

According to one aspect of the invention, wherein including the multimedia data includes using the multimedia data as a background image or background video of the user-composed message.

According to one aspect of the invention, wherein including the multimedia data includes selecting one of a plurality of different multimedia data for inclusion into the user-composed message.

According to one aspect of the invention, wherein selecting includes randomly or sequentially selecting one of the plurality of different multimedia data.

According to one aspect of the invention, wherein providing includes storing the multimedia data local to the electronic device or remote from the electronic device.

According to one aspect of the invention, a branded electronic device for promoting an interest of an entity includes: a communication circuit configured to establish a communication over a wireless network; and a messaging circuit operative to create messages for transmission to other devices via said communication circuit, said messaging circuit configured to automatically include into a user-composed message multimedia data that corresponds to the entity.

According to one aspect of the invention, the electronic device further includes a memory; and multimedia data stored in said memory, wherein said multimedia data corresponds to at least one of products, services, or interests of the entity.

According to one aspect of the invention, the messaging circuit is configured to embed the multimedia data into a template, and to use the template as a starting point for the user-composed message.

According to one aspect of the invention, the messaging circuit is configured to inhibit a user from at least one of altering the template or selecting a different template.

According to one aspect of the invention, the multimedia data is at least one of image data, audio data or video data.

According to one aspect of the invention, the messaging circuit is configured to include the multimedia data as a background image or background video of the user-composed message.

According to one aspect of the invention, the messaging circuit is configured to use multimedia messaging service (MMS) standard for the user-composed message.

According to one aspect of the invention, the multimedia data comprises a plurality of different multimedia data each corresponding to the entity, and said messaging circuit is configured to select one of the plurality of different multimedia data for inclusion into the user-composed message.

According to one aspect of the invention, the messaging circuit is configured to randomly or sequentially select one of the plurality of different multimedia data.

According to one aspect of the invention, the messaging circuit is configured to update the multimedia data based on predetermined events.

According to one aspect of the invention, the electronic device is at least one of a mobile phone, headset, personal digital assistant, portable gaming device, or smart phone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus, portable gaming devices, or the like.

In the present application, embodiments of the invention are described primarily in the context of a mobile telephone. However, it will be appreciated that the invention is not intended to be limited to the context of a mobile telephone and may relate to any type of appropriate electronic equipment, examples of which include a PDA, smart phone, computer, etc.

Branded electronic devices enable an entity such as, for example, a corporation, to increase their exposure to the general public. Such exposure, for example, may be geared toward increasing the sales of a product or service offered by the entity, which can be accomplished, for example, by advertising the products, services and/or brands directly on the electronic device (e.g., displaying a logo on the casing of a mobile phone, wherein the logo corresponds to the product, service, etc.).

Typically, branded electronic devices are provided to employees of a corporation, which pays the cost of the electronic device and/or fees associated with using the electronic device. The employee then may use the electronic device free of charge or at a reduced rate. In order to maximize the corporation's return on investment of the branded electronic device, it is desirable to reach as many people as possible, without incurring added expense.

A device and method in accordance with the present invention enables branded electronic devices, such as branded mobile phones or headsets, to increase exposure of various products, services, interests, causes, etc. advanced by an entity subsidizing the branded electronic device. This is accomplished by including multimedia data into messages (e.g., multimedia messages) created and sent via the branded electronic device. The term "multimedia data" broadly refers to any type of audio-based and/or video-based subject matter that directly or indirectly corresponds to a product, service, interest, cause, etc. that is being promoted or otherwise advanced by the subsidizing entity (e.g., to promote a company's product, communicate a political candidate's message, etc.). Multimedia data may take the form of a file such as, for example, an image file (e.g., a photograph), a music file, a ring tone, a video file, and so forth and may be stored locally by a memory of the electronic device or remotely, such as by a server. Further, an entity, as used herein, refers to any legal entity. This includes, for example, a person, partnership, corporation, etc.

Features of the invention will be described in connection with multimedia messaging service (MMS) and the Open Mobile Alliance (OMA) MMS 1.3 standard. It should be appreciated, however, that the aspects of the invention may be applied to other messaging techniques, and reference to MMS and OMA MMS 1.3 is merely exemplary.

MMS enables users to send and receive multimedia messages on their electronic devices, wherein the multimedia messages may include text, audio, graphics, photos, videos, and other media types within a single message. When using MMS to create and send messages, the MMS template standard specified in OMA MMS Message Template Specification, Candidate Version 1.3 can be used, the contents of which is hereby incorporated by reference in its entirety. In accordance with the invention, data, such as multimedia data, is automatically included with all user-composed messages originating from the electronic device, wherein the data directly or indirectly corresponds to the subsidizing entity's products, services, causes, etc. The data may take the form of electronic stationery (e.g., the user's message is reproduced on top of a background image so as to give the appearance of stationery), or as a movie screen on which the message is displayed (e.g., the message is scrolled over a video clip similar to credits at the end of a movie). The data also may be audio data that is played when the message recipient opens the message.

The data, which preferably is multimedia data, may be embedded in a template file that is used as a starting point each time the user composes a message. Preferably, the template file is locked such that the user cannot alter the template file or select a different template file. This ensures that the branded message is always included with outgoing user-composed messages.

For example, a user may be provided with a branded mobile phone, wherein the branded phone is subsidized by "company 123" (e.g., company 123 provides the branded phone to the user free of charge or at a reduced fee). Since company 123 is subsidizing the branded phone, the branded phone includes data corresponding to company 123's products, services, causes, etc. This data may include image data, such as logos, trademarks, etc., movie files, such as commercials for one or more products or services, and/or audio data, such as jingles or slogans, for example, that identify or relate to company 123. When the user composes a message on the branded mobile phone (e.g., a message to one of his contacts), the mobile phone will automatically include at least some of the data corresponding to company 123 into the message. The data may be included before the user actually creates the message, during message creation, or after the message has been created.

For example, if the user creates the message "Meet me at Joe's burger shop", the mobile phone may include company 123's logo as a background for the message. Then when the recipient opens the message, he will see the branded background as he reads the message (the background graphic may appear to a viewer as of stationery). Alternatively or in conjunction with the branded background, an audio file also may be included with the user created message. Then as the recipient opens the message, he will hear sound corresponding to the audio file (e.g., the company's jingle). In another embodiment, the background for the message may be in the form of a video, for example.

The branded electronic device may include a plurality of data corresponding to a plurality of different products, services, trademarks, causes, etc. of the subsidizing company, and the branded electronic device may be configured to randomly select one of the plurality of products, services, trademarks, etc. each time a new message is created. Alternatively, the selection process may be sequential (e.g., each time a message is created data corresponding to an item within a queue is selected, and then the next time a message is created the next item in the queue is selected). Regardless of how the data is selected, it is included into the user-composed message. In this manner, the subsidizing company may receive exposure for a number of different products, services, trademarks, etc. from a single branded electronic device.

The data corresponding to the products, services, etc. may be stored in memory of the phone (e.g., in non-volatile memory. Preferably, the contents of the memory is periodically updated so as to enable new products, services, etc. to be available on the electronic device. Alternatively, the data corresponding to the products, services, etc. may be stored remote from the electronic device (e.g., on a central server), and the electronic device accesses the remote data for inclusion with the user-composed messages. Such access may be based on a schedule (e.g., once per hour, day, week, month, etc.) or based on the user-composed messages (e.g., every time a new message is created, after 20 messages have been sent, etc.). Further details regarding the device and method in accordance with the invention will be discussed below with reference to the figures.

Figure 1:
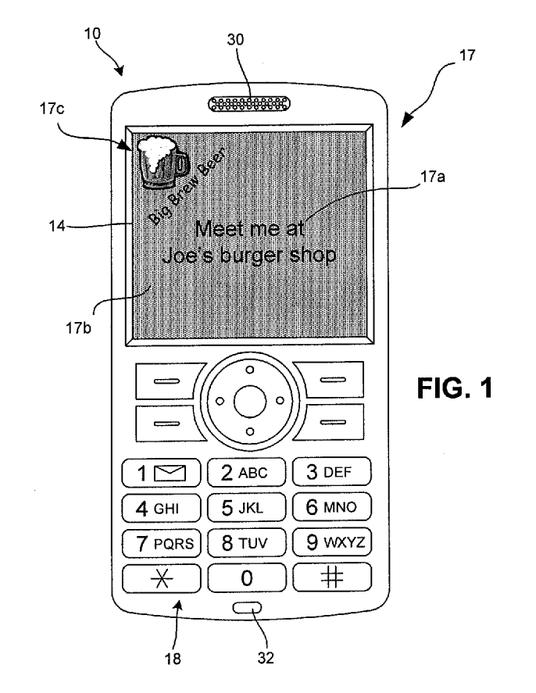
FIG. 1 is a schematic view of a mobile telephone as an exemplary electronic device in accordance with an embodiment of the present invention.
Figure 2:
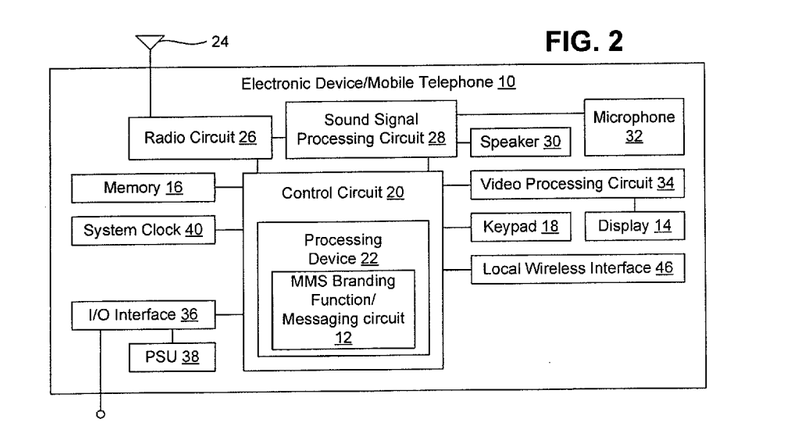
FIG. 2 is a schematic block diagram of the relevant portions of the mobile telephone of FIG. 1 in accordance with an embodiment of the present invention.

Referring to FIGS. 1 and 2, an electronic device 10 includes a branded messaging function 12 that is configured to embed data (e.g., multimedia data) into messages created by a user of the electronic device, wherein the data corresponds to the party subsidizing the electronic device. The electronic device 10 includes a display 14 for displaying information, such as incoming calls, messages, etc. as is conventional. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

Shown on the display 14 of FIG. 1 is a message 17 created in accordance with the present invention. More specifically, the message 17 includes a user-composed portion 17a superimposed on an electronic stationery 17b, wherein the stationery corresponds to an entity (e.g., "Big Brew Beer Co.") subsidizing the electronic device 10. As discussed below, data, such as multimedia data that forms the corner graphic 17c, is automatically included with user composed messages. As the user sends messages, such as the one illustrated in FIG. 1, to his friends, associates, etc., each recipient will be exposed to the multimedia data contained in the message. In this sense, each recipient is effectively exposed to an advertisement that is in the interest of the subsidizing entity.

Additional details and operation of the branded messaging function 12 will be described in greater detail below. The branded messaging function 12 may be embodied as executable code that is resident in and executed by the electronic device 10. In one embodiment, the branded messaging function 12 may be a program stored on a computer or machine readable medium. The branded messaging function 12 may be a stand-alone software application or form a part of a software application that carries out additional tasks related to the electronic device 10.

The electronic device 10 of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 includes the aforementioned display 14, which displays information to a user such as operating state, time, telephone numbers, contact information, various navigational menus, etc. A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 14. Keys or key-like functionality also may be embodied as a touch screen associated with the display 14. Also, the display 14 and keypad 18 may be used in conjunction with one another to implement soft key functionality.

The mobile telephone 10 includes communication circuitry that enables the mobile telephone 10 to establish a wireless call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages (e.g., a text message is commonly referred to by some as "an SMS," which stands for short message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. The memory 16 may be, for example, one or more of a buffer, a flash memory, a hard drive, a removable media, a volatile memory, a non-volatile memory, a random access memory (RAM), or other suitable device.

In addition, the processing device 22 may execute code that implements the branded messaging function 12. It will be apparent to a person having ordinary skill in the art of computer programming, and specifically in application programming for mobile telephones or other electronic devices, how to program the mobile telephone 10 to operate and carry out logical functions associated with the branded messaging function 12. Accordingly, details as to specific programming code have been left out for the sake of brevity. Also, while the branded messaging function 12 is executed by the processing device 22 in accordance with a preferred embodiment of the invention, such functionality could also be carried out via dedicated hardware, firmware, software, or combinations thereof, without departing from the scope of the invention. Such embodiments may be referred to as a branded messaging circuit 12 or simply messaging circuit 12. The branded messaging circuit 12 implements the branded messaging function as described herein.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20, which carries out overall operation of the phone 10. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

The mobile telephone 10 may include a camera for taking digital pictures and/or movies. Image and/or video files corresponding to the pictures and/or movies may be stored in the memory 16.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
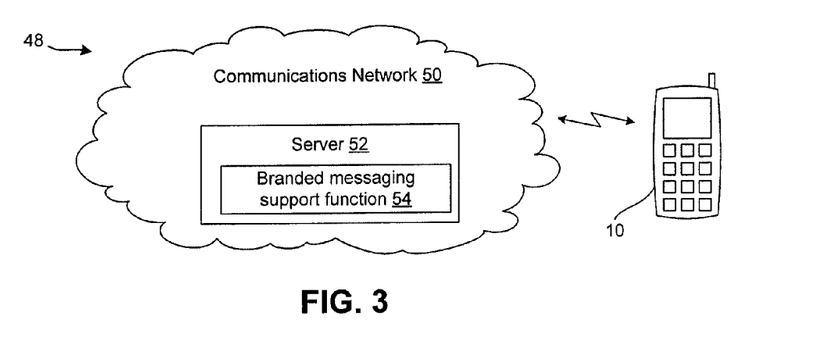
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52 and a memory to store such software. In one embodiment, the server 52 may be configured to store and execute a branded messaging support function 54 that interacts with the branded messaging function 12 of the mobile telephone 10. Details of the branded messaging support function 54 will be described below in greater detail. In one embodiment, the branded messaging support function 54 may be a program stored on a computer or machine readable medium. The branded messaging support function 54 may be a stand-alone software application or may form a part of a software application that carries out additional tasks related to the functions of the server 54. In one embodiment, the functions of the branded messaging support function 54 may be distributed among multiple servers, including one or more servers located outside the domain of the communications network 50. For instance, features of the branded messaging support function 54 may be hosted by an Internet server or a database server.

Figure 4:
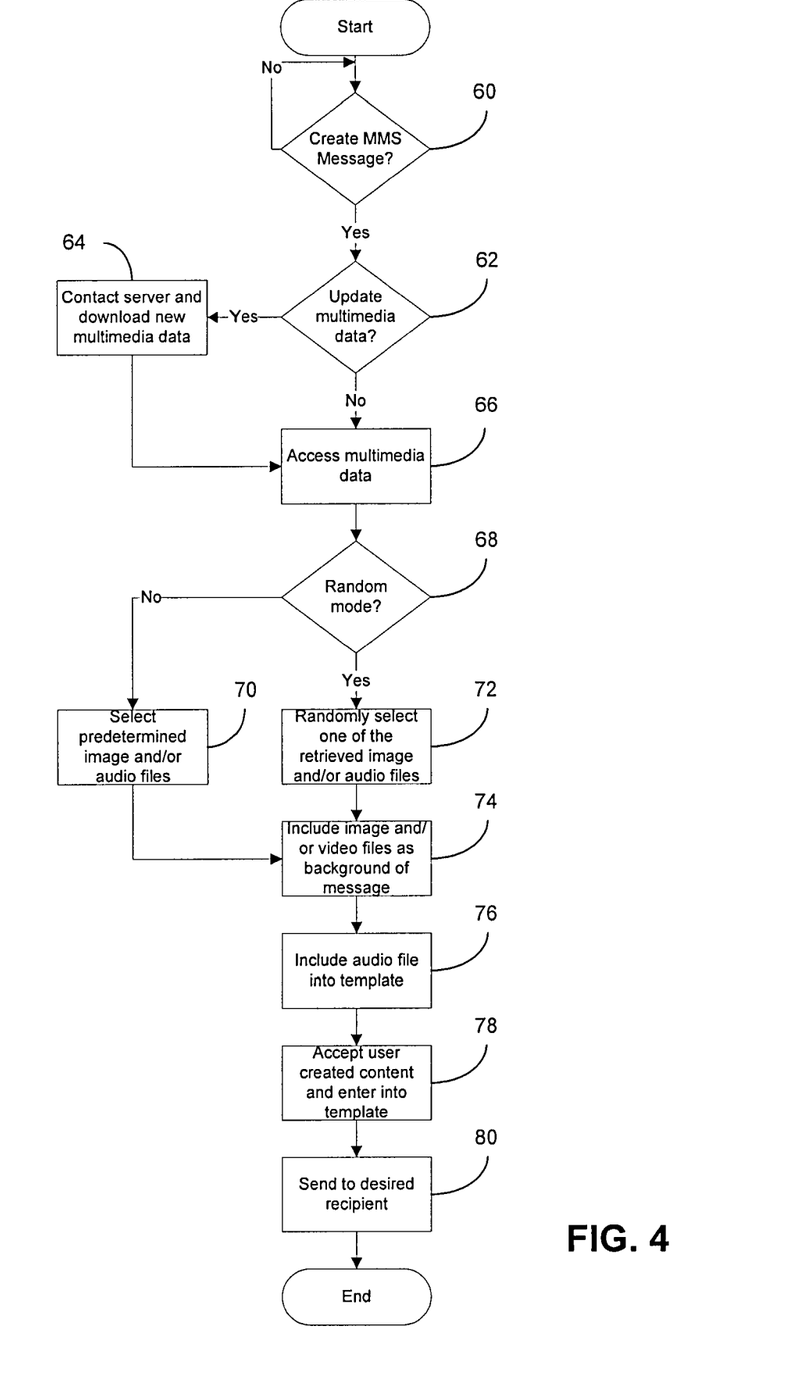
FIG. 4 is a flow chart representing an exemplary method of embedding ads in MMS stationery using the mobile telephone of FIG. 1.

With additional reference to FIG. 4, illustrated are logical operations to implement an exemplary method of branded messaging. The exemplary method may be carried out by executing an embodiment of the branded messaging function 12, for example. Thus, the flow chart of FIG. 4 may be thought of as depicting steps of a method carried out by the messaging function/circuit 12 of the mobile telephone 10 and/or the branded message support function 54 of the server 52. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for the branded messaging function 12 may begin in block 60 where the messaging circuit 12 determines if a multimedia message is being created (e.g., is the user of the electronic device attempting to compose a multimedia message?). If a multimedia message is not being created, then the method loops at block 60. However, if a multimedia message is being created, then the method moves to block 62 where the messaging circuit 12 determines if multimedia data corresponding to the subsidizing entity should be updated (e.g., whether or not new multimedia data should be downloaded to the electronic device). Such updating, for example, may be based on predetermined events.

For example, the entity subsidizing the electronic device 10 may prefer that the electronic device 10 refresh its data at a predefined interval. The interval may be time based (e.g., update once per hour, day, week, month, etc.) or message based (e.g., update once per every 1, 10, 50, 100 sent messages). If the update interval has expired, then at block 64 the messaging circuit 12, for example, contacts a server 52 and requests that the multimedia data for the subsidizing entity be updated. The server 52 then will proceed to execute the server support function 54 and retrieve multimedia data corresponding to the subsidizing entity from memory. Once retrieved, the server transfers the multimedia data to the electronic device 10, which can store the new data in memory 16. If the update interval has not expired (or if an update simply is not performed), then the method skips the update process and moves to block 66 where the messaging circuit 12 accesses the multimedia data.

Next at block 68 the messaging circuit 12 determines if one or more images will randomly or sequentially included into the user-composed message. Such determination may be based on settings specified by the subsidizing entity, for example, at the time the electronic device 10 is provided to the end user. If a sequential selection scheme is preferred, then at block 70 multimedia data, which may be stored in a queue formed in memory 16, is sequentially retrieved from memory. If a random selection scheme is preferred, then at block 72 the messaging circuit 12 randomly retrieves multimedia data from memory 16. Such random selection may be implemented using any known random selection routine known in the art.

If the subsidizing entity prefers that the same multimedia data is always used in user-composed messages, then only data corresponding to the preferred multimedia data may be stored in memory 16. Alternatively, multiple data may be present in memory, and a pointer can be set to correspond with particular multimedia data stored in memory. Both methods will result in the same data always being used for the user composed message.

At blocks 74, 76 and 78 the retrieved multimedia data (e.g., image, video and audio data) is included with the user composed message (e.g., text data). For example, the retrieved multimedia data may be inserted as background of the message (e.g., a background image or background movie), and the user composed message may be formed on top of this background. Preferably, a template is pre-created that includes the multimedia data embedded therein. Then each time the user composes a message, the template file corresponding to the selected multimedia data is used as a starting point for the message. Once the user has completed the message, it is sent as indicated at block 80. Then, as a recipient opens the message he will be exposed to the subsidizing entity's products, services, etc.

Accordingly, the device and method in accordance with the present invention enables a subsidizing entity of a branded electronic device, such as a corporation, to maximize its exposure via a branded electronic device. This in turn maximizes the subsidizing entity's return on investment in the branded electronic device.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A branded electronic device for promoting an interest of an entity, comprising:
   a communication circuit configured to establish a communication over a wireless network; and
   a messaging circuit operative to create messages for transmission to other devices via said communication circuit, said messaging circuit configured to obtain multimedia data corresponding to the entity or the interest of the entity, form electronic stationery based on the multimedia data, and automatically combine a user-composed message and the electronic stationery prior to transmission of the user composed message from the electronic device, wherein said messaging circuit is configured to update the multimedia data based on predetermined events.

2. The electronic device according to claim 1, further comprising:

a memory; and multimedia data stored in said memory, wherein said multimedia data corresponds to at least one of products, services, or interests of the entity.

3. The electronic device according to claim 1, wherein the multimedia data is at least one of image data, audio data or video data.

4. The electronic device according to claim 1, wherein said messaging circuit is configured to include the multimedia data as a background image or background video of the user-composed message.

5. The electronic device according to claim 1, wherein said messaging circuit is configured to use multimedia messaging service (MMS) standard for the user-composed message.

6. The electronic device according to claim 1, wherein the multimedia data comprises a plurality of different multimedia data each corresponding to the entity, and said messaging circuit is configured to select one of the plurality of different multimedia data for inclusion into the user-composed message.

7. The electronic device according to claim 6, wherein said messaging circuit is configured to randomly or sequentially select one of the plurality of different multimedia data.

8. The electronic device according to claim 1, wherein the electronic device is at least one of a mobile phone, headset, personal digital assistant, portable gaming device, or smart phone.

9. The electronic device according to claim 1, wherein the messaging circuit is configured to embed the multimedia data into a template, use the template as a starting point for the user-composed message, and inhibit a user from altering the template.

* * * * *